(12) United States Patent
Spivey et al.

(10) Patent No.: US 11,326,440 B2
(45) Date of Patent: May 10, 2022

(54) INSTRUMENTED COUPLINGS

(71) Applicant: ExxonMobil Upstream Research Company, Spring, TX (US)

(72) Inventors: Benjamin J. Spivey, Spring, TX (US); Kevin H. Searles, Kingwood, TX (US); Eric R. Grueschow, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/939,142

(22) Filed: Jul. 27, 2020

(65) Prior Publication Data

US 2021/0079783 A1    Mar. 18, 2021

Related U.S. Application Data

(60) Provisional application No. 62/902,111, filed on Sep. 18, 2019.

(51) Int. Cl.

| | |
|---|---|
| *E21B 47/01* | (2012.01) |
| *G01N 23/22* | (2018.01) |
| *E21B 17/042* | (2006.01) |
| *E21B 47/11* | (2012.01) |
| *E21B 47/14* | (2006.01) |

(Continued)

(52) U.S. Cl.
CPC ............ *E21B 47/01* (2013.01); *E21B 17/042* (2013.01); *E21B 34/066* (2013.01); *E21B 41/0085* (2013.01); *E21B 47/06* (2013.01); *E21B 47/07* (2020.05); *E21B 47/111* (2020.05); *E21B 47/14* (2013.01); *E21B 49/0875* (2020.05); *G01N 23/22* (2013.01); *E21B 19/16* (2013.01);

(Continued)

(58) Field of Classification Search
CPC .. E21B 47/10–11; E21B 17/042; E21B 17/02; E21B 17/04; E21B 17/0423; E21B 17/0426
See application file for complete search history.

(56) References Cited

U.S. PATENT DOCUMENTS 3,990,298 A    11/1976 Deans
3,993,131 A    11/1976 Riedel
(Continued)

FOREIGN PATENT DOCUMENTS

CA    2953096 A1    1/2016
CA    3014868 A1    8/2017
(Continued)

*Primary Examiner* — Kristyn A Hall
(74) *Attorney, Agent, or Firm* — ExxonMobil Upstream Research Company—Law Department (57) ABSTRACT

An instrumented coupling for pipe joints is described herein. The instrumented coupling includes a first threaded end configured to thread to a first pipe joint and a second threaded end configured to thread to a second pipe joint. The instrumented coupling also includes a sensor configured to obtain a measurement of a parameter of a well and a communications device configured to communicate to a receiving device outside of the well. The instrumented coupling further includes a processor configured to execute instructions in a data store. The instructions direct the processor to read the measurement from the sensor, compare the measurement from the sensor to a preset limit, and generate a signal within the communications device based, at least in part, on the measurement.

35 Claims, 9 Drawing Sheets

(51) Int. Cl.

| | | |
|---|---|---|
| *E21B 49/08* | (2006.01) | |
| *E21B 47/06* | (2012.01) | |
| *E21B 47/07* | (2012.01) | |
| *E21B 34/06* | (2006.01) | |
| *E21B 41/00* | (2006.01) | |
| *E21B 19/16* | (2006.01) | |
| *G01N 29/02* | (2006.01) | |
| *G01N 21/77* | (2006.01) | |
| *F16L 15/08* | (2006.01) | |

(52) U.S. Cl.
CPC .............. *F16L 15/08* (2013.01); *G01N 21/77* (2013.01); *G01N 29/022* (2013.01); *G01N 2021/7786* (2013.01)

(56) References Cited

U.S. PATENT DOCUMENTS

| | | | |
|---|---|---|---|
| 4,051,368 A | 9/1977 | Arnold et al. | |
| 4,151,413 A | 4/1979 | Arnold | |
| 4,558,219 A | 12/1985 | LeBlanc et al. | |
| 4,622,463 A | 11/1986 | Hill | |
| 4,825,072 A | 4/1989 | McWhirter et al. | |
| 5,077,471 A | 12/1991 | Smith, Jr. et al. | |
| 5,543,617 A | 8/1996 | Roscoe et al. | |
| 5,723,781 A | 3/1998 | Pruett et al. | |
| 6,401,547 B1 | 6/2002 | Hatfield et al. | |
| 6,799,634 B2 | 10/2004 | Hartog et al. | |
| 6,840,316 B2 | 1/2005 | Stegemeier et al. | |
| 6,981,553 B2 | 1/2006 | Stegemeier et al. | |
| 7,055,592 B2 | 6/2006 | Bass et al. | |
| 7,114,401 B2 | 10/2006 | Peter | |
| 7,259,688 B2 | 8/2007 | Hirsch et al. | |
| 7,322,410 B2 | 1/2008 | Vinegar et al. | |
| 7,711,486 B2 | 5/2010 | Thigpen et al. | |
| 7,775,272 B2 | 8/2010 | Nelson et al. | |
| 8,078,404 B2 | 12/2011 | Sjolie et al. | |
| 8,118,094 B2 | 2/2012 | Mouget et al. | |
| 8,141,633 B2 | 3/2012 | Hampton et al. | |
| 8,162,049 B2 | 4/2012 | Rose | |
| 8,173,955 B2 | 5/2012 | Kalb | |
| 8,275,549 B2 | 9/2012 | Ramirez Sabag et al. | |
| 8,393,395 B2 | 3/2013 | Cochet et al. | |
| 8,443,915 B2 | 5/2013 | Storm, Jr. et al. | |
| 8,596,354 B2 | 12/2013 | Hartshorne et al. | |
| 8,949,029 B2 | 2/2015 | Nyhavn | |
| 8,952,319 B2 | 2/2015 | Rose | |
| 9,068,439 B2 | 6/2015 | Walton et al. | |
| 9,212,540 B2 | 12/2015 | Woiceshyn | |
| 9,290,689 B2 | 3/2016 | Lafitte et al. | |
| 9,353,607 B2 | 5/2016 | Hallundbaek et al. | |
| 9,359,886 B2 | 6/2016 | Cameron | |
| 9,416,651 B2 | 8/2016 | Gomes et al. | |
| 9,422,793 B2 | 8/2016 | Gomes et al. | |
| 9,555,509 B2 | 1/2017 | Woiceshyn et al. | |
| 9,664,035 B2 | 5/2017 | Nyhavn | |
| 9,715,036 B2 | 7/2017 | Murgesan et al. | |
| 9,835,024 B2 | 12/2017 | Ramirez Sabag et al. | |
| 9,863,222 B2 | 1/2018 | Morrow et al. | |
| 9,896,913 B2 | 2/2018 | Nyhavn et al. | |
| 10,030,514 B2 | 7/2018 | Sheehy et al. | |
| 10,060,258 B2 | 8/2018 | Rowe | |
| 10,100,632 B2 | 10/2018 | Nyhavn et al. | |
| 10,107,095 B2 | 10/2018 | Christian et al. | |
| 10,151,198 B2 | 12/2018 | Sira et al. | |
| 2001/0036667 A1* | 11/2001 | Tayebi | G01N 33/24 436/56 |
| 2003/0131991 A1* | 7/2003 | Hartog | E21B 27/02 166/250.12 |
| 2004/0084186 A1 | 5/2004 | Allison | |
| 2008/0262737 A1 | 10/2008 | Thigpen et al. | |
| 2009/0025470 A1 | 1/2009 | Green et al. | |
| 2009/0294175 A1* | 12/2009 | Cartellieri | E21B 47/10 175/50 |
| 2011/0100135 A1 | 5/2011 | Franco et al. | |
| 2011/0277996 A1 | 11/2011 | Cullick et al. | |
| 2013/0000399 A1* | 1/2013 | Lilly | E21B 47/017 73/152.58 |
| 2013/0245953 A1 | 9/2013 | Gonzales et al. | |
| 2014/0343908 A1 | 11/2014 | Nyhavn | |
| 2015/0353817 A1* | 12/2015 | Kersey | E21B 43/26 166/250.12 |
| 2016/0272882 A1 | 9/2016 | Stray et al. | |
| 2016/0320769 A1 | 11/2016 | Deffenbaugh et al. | |
| 2017/0044880 A1* | 2/2017 | Yeh | E21B 43/12 |
| 2017/0183955 A1 | 6/2017 | Peacock et al. | |
| 2017/0306743 A1* | 10/2017 | Difoggio | E21B 7/06 |
| 2017/0306753 A1 | 10/2017 | Xu et al. | |
| 2017/0350236 A1 | 12/2017 | Shen et al. | |
| 2017/0370210 A1 | 12/2017 | Nyhavn et al. | |
| 2018/0155597 A1 | 6/2018 | Burns et al. | |
| 2018/0163532 A1* | 6/2018 | Zhang | E21B 47/001 |
| 2018/0275114 A1 | 9/2018 | Kosynkin et al. | |
| 2018/0363452 A1 | 12/2018 | Murugesan et al. | |
| 2019/0024503 A1 | 1/2019 | Prince et al. | |
| 2019/0063192 A1* | 2/2019 | Lhommet | E21B 47/00 |
| 2020/0263535 A1* | 8/2020 | Roessler | E21B 34/102 |
| 2020/0362693 A1* | 11/2020 | Ahmadian-Tehrani | E21B 47/11 |

FOREIGN PATENT DOCUMENTS

| | | |
|---|---|---|
| CN | 101338668 B | 2/2012 |
| CN | 109138978 A | 1/2019 |
| EP | 3249151 A1 | 11/2017 |
| GB | 2036957 A | 7/1980 |
| GB | 2500234 B | 9/2019 |
| WO | 8300743 | 3/1983 |
| WO | 2018143814 A1 | 8/2018 |

* cited by examiner

INSTRUMENTED COUPLINGS

CROSS-REFERENCE TO RELATED APPLICATION

This application claims the benefit of U.S. Provisional Application 62/902,111 filed Sep. 28, 2019 entitled INSTRUMENTED COUPLINGS, the entirety of which is incorporated by reference herein.

FIELD

The techniques described herein provide a method for measuring well parameters. Specifically, instrumented couplings between pipe joints are used to track well parameters and communicate the results to the surface.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

Lateral wells can experience sand deposition once the well starts flowing. The sand deposition may begin immediately once flow starts or over an extended period of time. Current techniques for sand monitoring rely on sand returning to the surface but do not estimate the location or magnitude of sand buildup in wells.

SUMMARY

An exemplary embodiment provides a method for using an instrumented coupling to monitor parameters in a well. The method includes monitoring the well for a signal from the instrumented coupling and adjusting the parameters based on the signal. The method may include releasing compounds into a fluid flow from the well based, at least in part, on the parameters. The method may also include detecting compounds in the fluid flow by fluorescence or based, at least in part, on radioactivity of the compounds. The method may further include communicating with the instrumented coupling through an ultrasonic transceiver.

The signal may indicate a level of sand in the well, an amount of entrained water in a fluid from the well, an amount of entrained gas in a fluid from the well, a pressure of a fluid within the well, a temperature of a fluid within the well, and/or a flow rate of a fluid within the well. The method may also include placing the instrumented coupling between pipe joints, tripping the pipe joints into the well, and activating the instrumented coupling.

Another exemplary embodiment provides an instrumented coupling for pipe joints. The instrumented coupling includes a first threaded end that threads to a first pipe joint, a second threaded end that threads to a second pipe joint, a sensor that obtains a measurement of a parameter of a well, and a communications device that communicates to a receiving device outside of the well. The instrumented coupling also includes a processor that executes instructions in a data store. The instructions direct the processor to read the measurement from the sensor, compare the measurement from the sensor to a preset limit, and generate a signal within the communications device based, at least in part, on the measurement.

The sensor may include a surface acoustic wave sensor or a thin-film bulk acoustic resonator sensor. The instrumented coupling may also include a number of sensors disposed in an inset ring in an inner circumference of the instrumented coupling between the first threaded end and the second threaded end.

The communications device may include a reservoir including a store of a tracer compound and a control valve that releases a controlled amount of the tracer compound into a fluid flow in the pipe joints. The control valve may include a microelectronic mechanical system (MEMS) valve. The tracer compound may include a fluorescent dye or a radioactive isotope. The tracer compound may be detected by a receiving device at a surface.

The control valve may release the controlled amount of the tracer compound into the fluid flow in the pipe joints based, at least in part, on the parameter of the lateral wellbore. The control valve may also release controlled amounts of different tracer compounds into the fluid flow in the pipe joints based, at least in part, on the parameter of the lateral wellbore.

The communications device may also include an ultrasonic transceiver or a power line communications transceiver. The instrumented coupling may include a battery. The instrumented coupling may also include an energy harvesting system that obtains energy from a flow of fluid through the instrumented coupling.

Another exemplary embodiment provides a lateral wellbore. The lateral wellbore includes a pipe string including an instrumented coupling disposed between pipe joints in the pipe string. The instrumented coupling is configured to detect a parameter of the lateral wellbore and send a signal to a surface device.

The instrumented coupling may be configured to release a compound in a fluid flow in the pipe string based, at least in part, on detecting the parameter of the lateral wellbore. The instrumented coupling may also be configured to release an amount of the compound based, at least in part, on the parameter of the lateral wellbore. The instrumented coupling may further be configured to release different compounds based, at least in part, on the parameter of the lateral wellbore.

The parameter may include a level of sand within the lateral wellbore, a temperature of a fluid within the lateral wellbore, a pressure of a fluid within the lateral wellbore, and/or a flow rate of a fluid within the lateral wellbore. The instrumented coupling may be configured to communicate with the surface device through an ultrasonic transceiver.

DESCRIPTION OF THE DRAWINGS

The advantages of the present techniques are better understood by referring to the following detailed description and the attached drawings.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, a "coupling" refers to a short length of pipe used to connect longer lengths of pipe. For example, a coupling may be used to connect two joints to make a longer segment of pipe. The coupling may have internal threads, external threads, or internal threads at one end and external threads at the opposite end to match with the threads on pipe segments at each end of the coupling.

As used herein, a "joint" refers to a single unitary length of pipe. As used herein, the term "joint" may include a length of pipe, usually referring to drillpipe, casing or tubing. While there are different standard lengths, the most common drillpipe joint length is around 30 ft. (9 m). For casing, the most common length of a joint is 40 ft. (12 m).

As used herein, a "pipe" refers to any tubular that carries pressurized gases or liquids, such as a pipeline, a production tubing line, a riser, a flow line, and a choke and kill line, for example. A pipe can also mean a conduit or duct operable to contain a fluid flow, and is therefore not limited to a cylindrical cross section conduit typically referred to as a pipe.

As used herein, "tripping in" to a well may be defined as the operation of lowering or running a tool or tubing string into a wellbore.

As used herein, a "tubular" means all forms of drill pipe, tubing, casing, drill collars, liners, and other tubulars for oilfield operations as are understood in the art. A tubular may also refer to a fluid conduit having an axial bore, and includes, but is not limited to, a riser, a casing, a production tubing, a liner, and any other type of wellbore tubular known to a person of ordinary skill in the art. In an example, a tubular refers to any structure that may be generally round, generally oval, or even generally elliptical. A tubular may also include any substantially flexible line, umbilical or a bundle thereof, that can include one or more hollow conduits for carrying fluids, hydraulic lines, electrical conductors or communications lines. These tubulars can also be collectively referred to as jumpers. The term "tubular" may be used in combination with the term "joint" to mean a single unitary length, or with the term "stand" to mean two or more interconnected joints.

As used herein, the terms "well" and "wellbore" refer to any type of fluidic connection between surface equipment and a subsurface location, or reservoir. A well or wellbore may be cased, cased and cemented, or open-hole, and may be any type of well, including, but not limited to, a producing well, an experimental well, an exploratory well. Wellbores may be vertical, horizontal, any angle between vertical and horizontal, diverted or non-diverted, or any combinations thereof, such as, for example, a vertical well with a non-vertical component. Generally, the wells referred to herein are used in the production of fluids from fractured rock, and include substantial lateral segments, which may be nearly horizontal. The lateral segments are prone to sand buildup from the well. However, the techniques described herein may be used with any number of different kinds of wells, including wells having vertical segments, or any combinations of vertical and lateral segments.

Downhole sensors to measure the amount of sand buildup and pressures throughout a well would help explain production differences between wells, and between different segments in a well. These sensors could also provide guidance on when and where to perform well work for removing sand and could provide guidance for fracturing design on future wells. However, installing sensors at varying points throughout a well may be difficult or expensive.

Examples described herein provide an instrumented coupling that uses one or more sensors to measure sand mass, fluid pressure, fluid temperature, fluid flow rate, and/or other parameters, such as in lateral sections of producing wells. The measurements may be communicated to the surface by releasing tracer compounds or other techniques, as described herein. As used herein, tracer compounds, or tracers, are chemical substances that can be detected by a receiving device at the surface by fluorescence, radioactivity, and the like.

In other systems, the communication of the measurements may be performed by ultrasonic communications through the fluid in the casing. In these example, the receiving device is an ultrasonic transceiver located at the surface.

The systems are not limited to wireless type communications, such as the release of tracer compounds or the ultrasonic communications, but may also use wired communications. In some examples, a power line communications transceiver is used to communicate with the surface using a high-frequency signal imposed on a power line.

Although the applications described herein discuss the use of the instrumented coupling in casing applications, for example, in lateral fractured wells, it may be used in other applications. For example, an instrumented coupling may be placed between the pipe joints of a drilling string or a production string.

Figure 1:
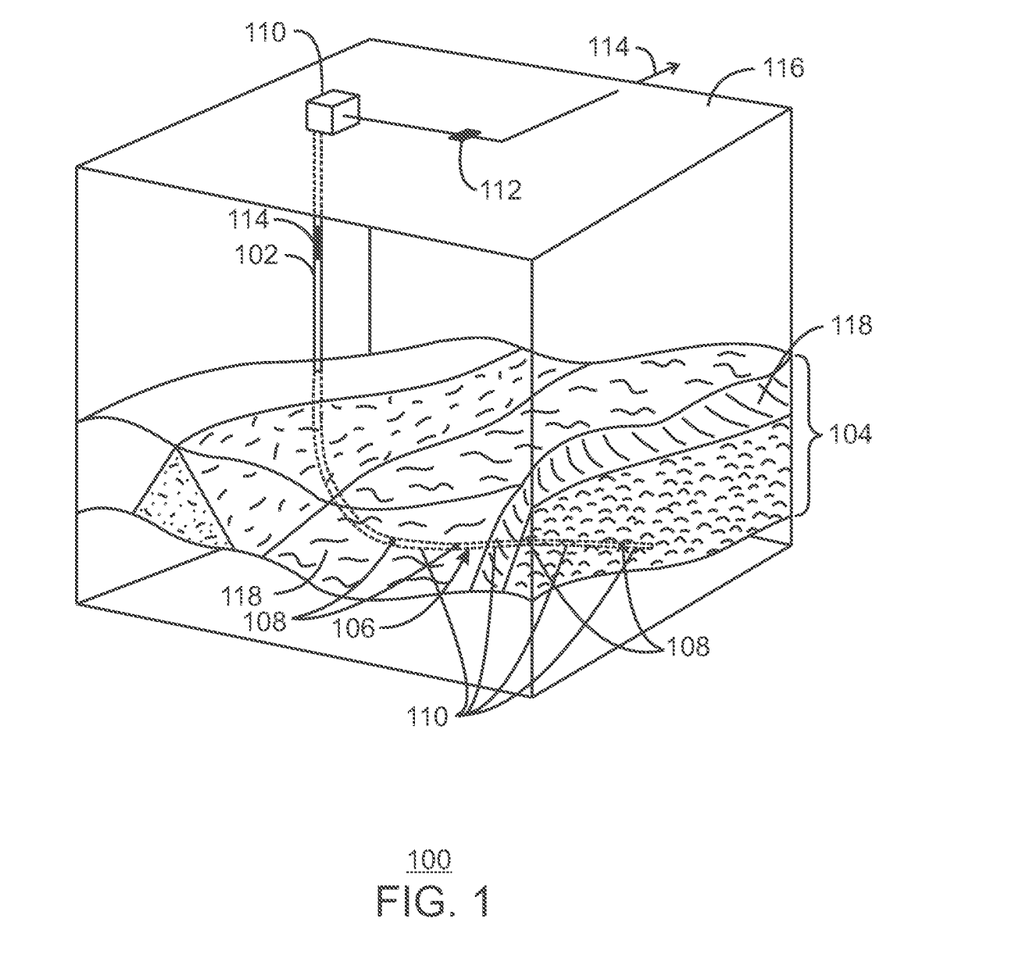
FIG. 1 is a drawing of a well drilled to a reservoir, wherein the well has a lateral section and instrumented couplings to measure sand deposition and other well parameters, in accordance with examples.

FIG. 1 is a drawing 100 of a well 102 drilled to a reservoir 104, wherein the well 102 has a lateral section 106 and instrumented couplings 108 to measure sand deposition and other well parameters, in accordance with examples. A well head 110 couples the well 102 to other devices 112 that can be used for communicating with the instrumented couplings, such as a fluorimeter, an ultrasonic transceiver, or a power line communications device, among others. The lateral section 106 may make the well 102 particularly vulnerable to sand, or other debris, settling out of the production fluids 114, which may impede the flow of the production fluids 114 out of the well 102 or even block the well.

Current techniques for the determination of sand in the well 102 are based on detecting sand in the production fluids 114 as they are brought to the surface 116. However, the amount of sand in the well 102, the location of the sand in the well 102, and other parameters cannot be determined from finding the sand in the production fluids 114. Further, the entrainment of gas or water from other layers 118 in the reservoir 104 may be detected at the surface 116. However, the particular layer of the reservoir 104 from which the gas or water is originating cannot be determined from the detection of these materials at the surface 116.

In examples described herein, the instrumented couplings 108 may have multiple sensors disposed around the instrumented couplings 108 to determine various well parameters, such as sand levels, fluid temperatures, fluid pressures, fluid flow rates, amounts of entrained gas, or amounts of entrained water. The instrumented couplings 108 may use communications devices, including ultrasonic transceivers or the release of tracer compounds to communicate well parameters measured at the instrumented couplings 108 to the surface 116. As described herein, the tracer compounds may include, for example, fluorescent compounds or radioactive compounds, or both.

Figure 2A:
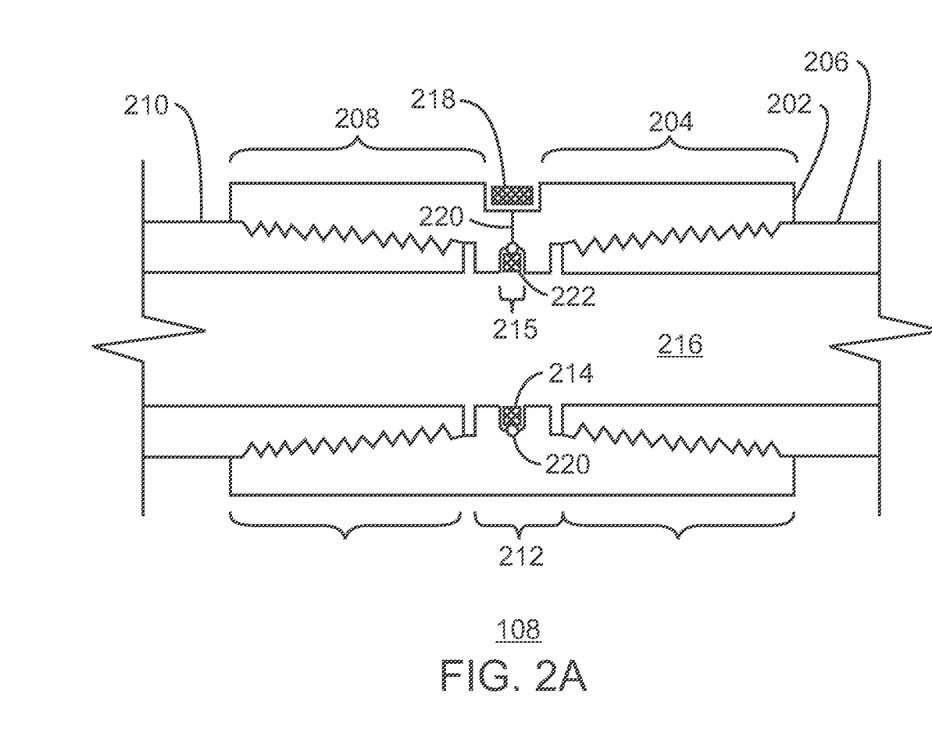
FIGS. 2A and 2B are side and front cross-sectional views of an instrumented coupling, in accordance with an example.
Figure 2B:
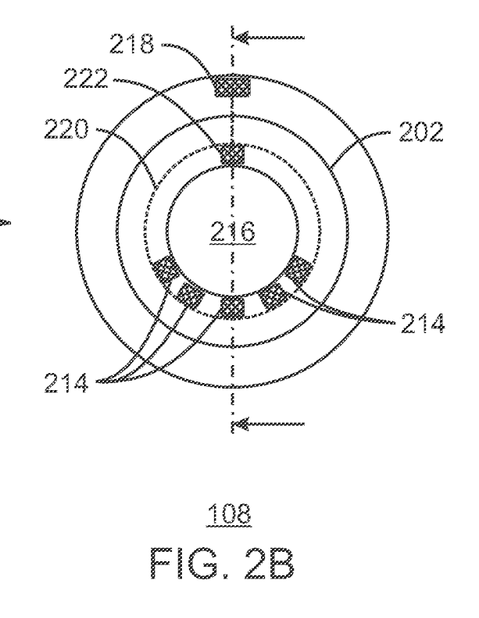

FIGS. 2A and 2B are side and front cross-sectional views of an instrumented coupling 108, in accordance with an example. Like numbered items are as described with respect to FIG. 1. The casing 202 of the instrumented coupling 108 has a first threaded end 204 configured to thread to a first pipe joint 206 and a second threaded end 208 configured to thread to a second pipe joint 210, connecting the two pipe joints 206 and 210, for example, to form a pipe stand or pipe string. In this example, the casing 202 has a ridge 212 positioned in the axial center, similar to a premium coupling.

Figure 5:
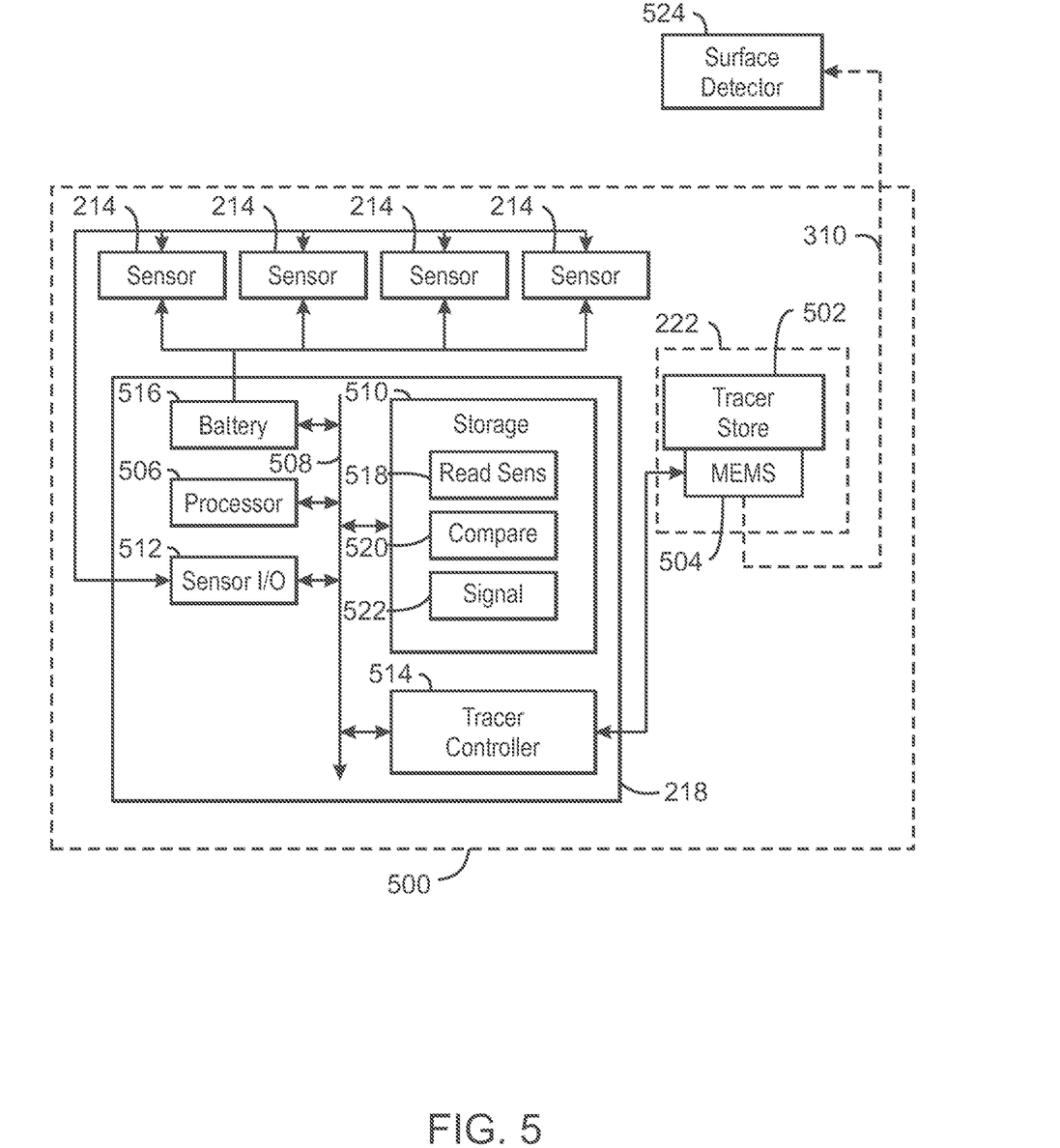
FIG. 5 is a block diagram of an instrumentation package that may be used in the instrumented coupling, in accordance with an example.
Figure 6:
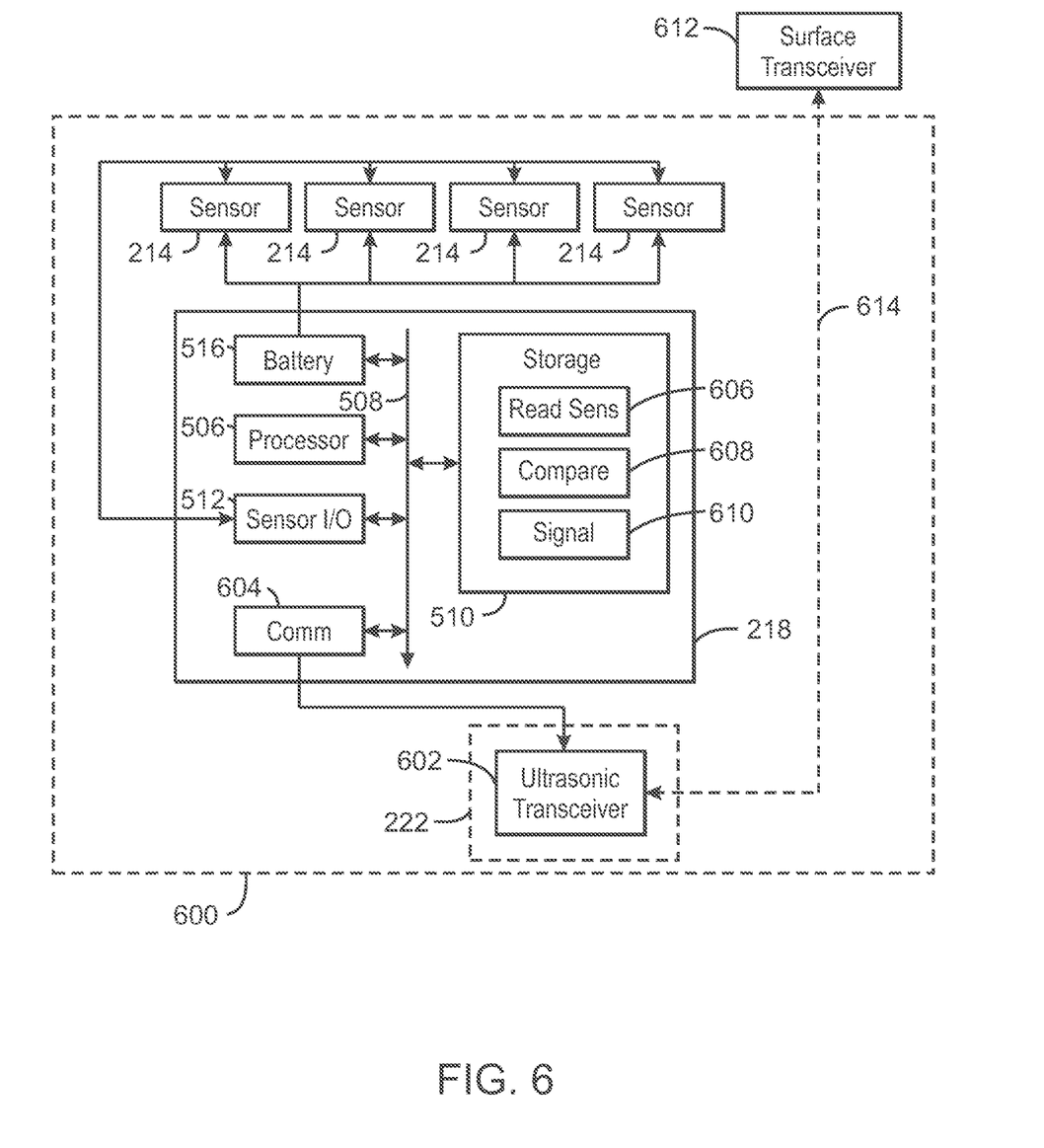
FIG. 6 is a block diagram of another instrumentation package that may be used in an instrumented coupling, in accordance with an example.

The instrumented coupling 108 includes an instrumentation package, discussed further with respect to FIGS. 5 and 6. The instrumentation package includes multiple sensors 214 located circumferentially around the instrumented coupling 108 to allow the measurement of well parameters, for example, in an inset ring 215 in the ridge 212. The sensors 214 may be disposed proximate to, or in contact with, the interior 216 of the casing 202, allowing the sensors 214 to measure characteristics of fluid flowing through the pipe string, for example, mass, pressure, temperature, flow rate, solids level, composition, entrained gas, and entrained water, among other characteristics. In some examples, the sensors 214 include a surface acoustic wave sensor, a thin-film bulk acoustic resonator sensor, or an optical sensor, or any combinations thereof, among others.

The measurements of the well parameters may be communicated to a controller 218 through wires 220 disposed within the casing 202, or within the inset ring 215 in which the sensors 214 are mounted. As described further with respect to FIG. 5, the controller may include a processor to collect data from the sensors, and communicate the results to a surface device using a communications device 222.

The communications device 222 is coupled to the controller 218, and, in this example, is placed in contact with the interior 216 of the casing 202. This places the communications device 222 in contact with fluid flow through the interior 216, allowing communications through the fluid. The communications device 222 may include tracer compounds, for example, released into the fluid flow through the interior 216, as described further with respect to FIG. 5. In other examples, the communications device 222 may include an ultrasonic transducer used to communicate through the fluid in the interior 216. This is described further with respect to FIG. 6.

Figure 7:
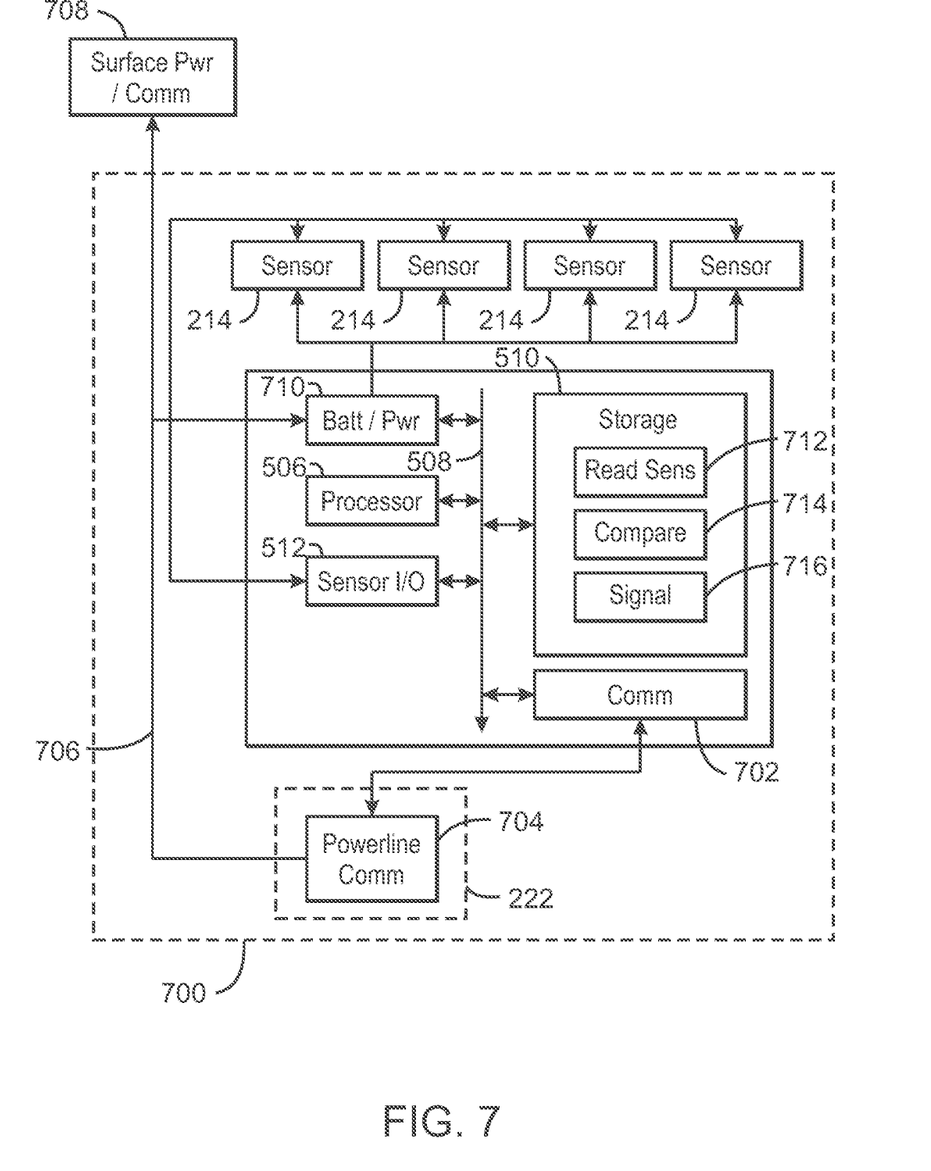
FIG. 7 is a block diagram of another instrumentation package that may be used in an instrumented coupling, in accordance with an example.

In other examples, the communications device 222 is a power line communicator that conveys data by placing a high-frequency signal on a power line, for example, running along or through the pipe string, as described further with respect to FIG. 7. Multiple instrumented couplings 108 may be placed in the well, for example, in lateral wellbores, to provide detailed production data.

Figure 3A:
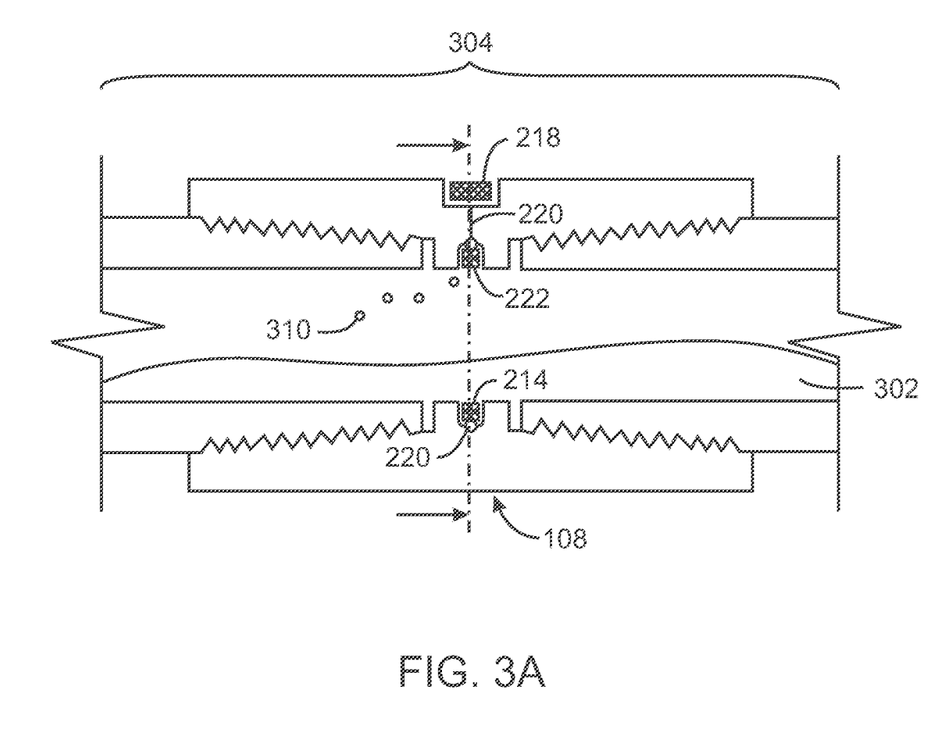
FIGS. 3A and 3B are schematic diagrams of the use of an instrumented coupling to indicate a level of sand within a lateral section of a pipe string, in accordance with an example.
Figure 3B:
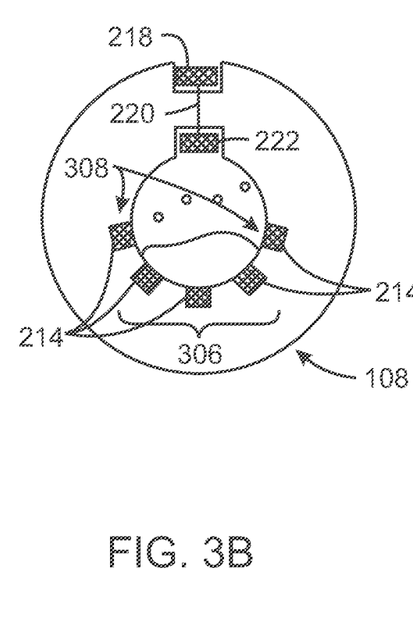

FIGS. 3A and 3B are schematic diagrams of the use of an instrumented coupling 108 to indicate a level of sand 302 within a lateral section of a pipe string 304, in accordance with an example. Like numbered items are as described with respect to FIGS. 1, 2A, and 2B. In this example, the sand 302 covers a portion 306 of the sensors 214 and leaves another portion 308 of the sensors 214 uncovered. This allows the controller 218 to use the measurements from the sensors 214 to determine an approximate level for the sand 302 in the pipe string 304. The controller 218 may then communicate the approximate level of the sand 302 in the pipe string 304 to the surface, for example, through the communications device 222.

In this example, the communications device 222 is a tracer module located at the top of the instrumented coupling 108. The tracer module is coupled to the controller 218 to direct the tracer module to release tracer compounds 310. In various examples, both different tracers and different quantities of tracer compounds 310 are released, based upon the value of the measured parameters. The controller 218, sensors 214, and communications device 222 may be powered by a battery (not shown) installed on the outer diameter of the instrumented coupling 108.

The instrumented coupling 108 detects the level of sand 302 by using the sensors 214 located in the inner circumference of the instrumented coupling 108. The detection may be performed by detecting mass located above the sensors. The level of the sand 302 may be approximated by comparing the values from multiple sensors. The sensors 214 may include temperature sensors, mass sensors, ultrasonic sensors, and radar sensors, among many others. In various embodiments, the sensors 214 are also used to detect other well parameters, such as the pressure, temperature, and/or flow rate of a fluid within the well.

The communications device 222, or tracer module in this example, holds a variety of tracer compounds, which may include chemical tracer compounds, radioactive tracer compounds, or both. In this example, the controller 218 directs the tracer module to release a specified ratio of different types of tracer compounds based on the measured parameter of interest. The range of ratios of different tracer types may be calibrated against the range of the measured parameter of interest.

Figure 4A:
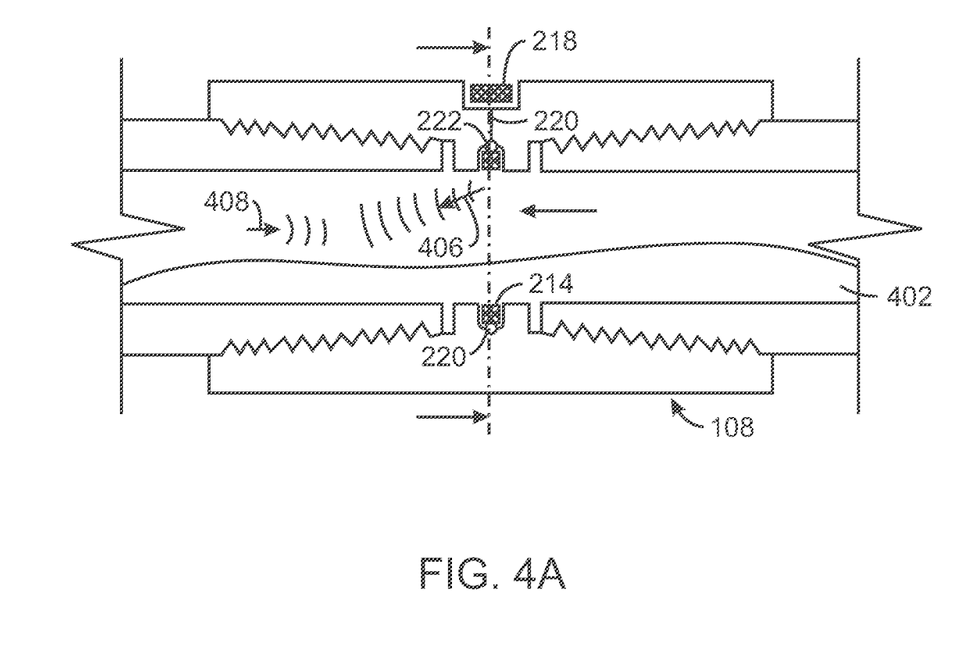
FIGS. 4A and 4B are side and front cross-sectional views of another example of an instrumented coupling that uses ultrasonic waves to communicate with the surface, in accordance with an example.
Figure 4B:
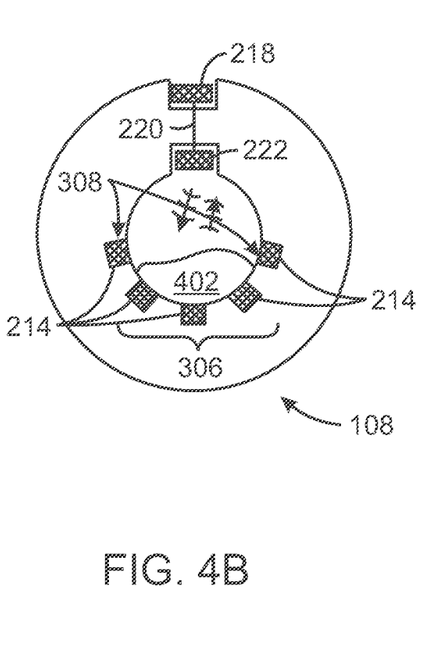

FIGS. 4A and 4B are side and front cross-sectional views of another example of an instrumented coupling 108 that uses ultrasonic waves to communicate with the surface, in accordance with an example. Like numbered items are as described with respect to FIGS. 1, 2A, 2B, 3A, and 3B. The instrumented coupling 108 detects the level of sand 402, and other well parameters, by using the sensors 214, as described with respect to FIGS. 3A and 3B.

In this example, the communications device 222 is an ultrasonic transceiver coupled to the controller 218. The ultrasonic transceiver may emit sound waves 406 that travel through the fluid to communications devices at the surface, and, in this example, may detect other sound waves 408 that are used by the communications devices at the surface to control the instrumented coupling 108. For example, the communications devices at the surface may instruct the instrumented coupling 108 to activate and take measurements, or to go into a reduced power mode and stop taking measurements, in order to conserve battery power. The measurements may be encoded as pulse trains carrying digitally encoded signals in the sound waves 406 emitted by the ultrasonic transceiver.

FIG. 5 is a block diagram of an instrumentation package 500 that may be used in the instrumented coupling 108, in accordance with an example. The instrumentation package 500 includes the sensors 214, the controller 218, and the communications device 222. Like numbered items are as described with respect to FIGS. 1, 2A, 2B, 3A, and 3B. In this example, the sensors 214 use micro-electromechanical systems (MEMS) technology for low power consumption by the sensors 214, for example, in the range of about 10 to about 100 µW per sensor. The sensors may be surface acoustic wave (SAW) sensors or thin-film bulk acoustic resonator (FBAR) sensors that may detect mass, pressure, and temperature.

In this example, the communications device 222 is a tracer module. The tracer module includes a tracer store 502 that holds a tracer compound, such as oilfield dyes that are available from Pylam Products Company, Inc., of Tempe, Ariz., or the dyes in the Perform Tracer Dyes product line available from Schlumberger Limited of Houston, Tex. These dyes are generally fluorescent dyes that provide a strong emission at parts per million levels or below. However, the dyes are not limited to fluorescent dyes, but may include adsorption dyes, among others.

While radioactive tracers are standardly used for biological applications, such as in diagnostics, they may be used in the current techniques as well. The radioactive tracers selected may have short half-lives, and no natural analogs to cause interferences. Radioactive tracers are used for data logging in oilfield applications in both fractured and non-fractured wells. Examples of radioactive isotopes that may be used as tracers in the present techniques include antimony-124, argon-41, cobalt-60, iodine-131, iridium-192, lanthanum-140, manganese-56, scandium-46, sodium-24, silver-110m, technetium-99m, and xenon-133, among others.

The tracer module may also include a MEMS device 504, or a control valve, for releasing small amounts of the tracers from the tracer store 502. The MEMS device 504 may be a micro pump using MEMS technology, such as a diaphragm micro pump, a peristaltic micro pump, a capillary micro pump, or a MEMS gear based micro pump, among others.

The communications device 222 does not need to only have one tracer store 502, but may include multiple tracer stores 502, wherein each has an individually activated MEMS device 504. In these examples, different tracers may be used to communicate file save information about the measurement. For example, a first tracer may be released to indicate that the instrumentation package 500 is operational, while a second tracer may be released to indicate that sand has been detected in the well. Other tracers may be released to indicate the level of the sand in the well, for example, where the presence of each tracer represents a binary digit, or the amount of a tracer represents the level of sand detected. The amount of the tracer released is determined by the controller 218, based on measurements from the sensors 214.

The controller 218 includes a processor 506 to perform the control operations. In various examples, the processor 506 is a microprocessor, for example, built into a system-on-a-chip (SOC). This example configuration may provide a low power configuration. However, the processor is not limited to a microprocessor or an SOC, but may include a single core processor, a multi-core processor, an application-specific integrated circuit (ASIC), or any number of other units. The processor 506 is coupled to other units in the controller 218 through a bus 508. The bus 508 may include high-speed communications links, a proprietary bus in an SOC, and the like. In some examples, the bus 508 is a proprietary bus in an SOC. In other examples, the bus 508 is an inter-integrated circuit (I2C) bus.

The bus 508 couples the processor 506 to a data store 510, for example, for storage of programs and intermediate results. The data store 510 may include random access memory (RAM), nonvolatile random access memory (NVRAM), read only memory (ROM), or other types of electronic memory including, for example, static RAM (SRAM), flash drives, and the like. In some embodiments, the data store 510 includes ROM for the storage of operational programs, and intermediate results in calculations are stored in RAM and registers associated with the processor 506. However, the controller 218 is not limited to the use of electronic memory, and, in some examples, may include other data storage systems, such as hard drives, optical drives, phase change memory, and the like.

The controller 218 includes a sensor I/O interface 512 that couples the bus 508 to the sensors 214. In some examples, sensor I/O interface 512 includes a low power, high speed, serial bus, such as a serial peripheral interface (SPI), or an inter-integrated circuit (I2C) bus, among others. In other examples, the sensor I/O interface 512 is an analog bus, such as a 4-20 mA current loop, and the like.

A tracer controller 514 couples to the bus 508 of the controller 218 to the MEMS device 504 to allow for releasing a controlled amount of a tracer compound. The tracer controller 514 may be a digital output used to send a pulse train to the MEMS device 504, for example, to advance or open the MEMS device 504, releasing a known amount of the tracer compound per pulse. In some examples, the tracer controller 514 is part of the serial bus used by the sensor I/O interface 512. In other examples, the tracer controller 514 is an analog output configured to open a MEMS valve, for example, releasing an amount of the tracer compound that is proportional to the analog signal.

The instrumentation package 500 may be powered by a battery 516, for example, within the controller 218. In some examples, the battery 516 is an intrinsically safe battery installed inside the outer diameter of the instrumented coupling. The battery 516 may be coupled to the sensors 214 through a circumferential power wire, for example, in the inset ring of the instrumented coupling. The battery 516 may be charged from the surface through a control line. In other examples, the battery 516 may be replaced or augmented with systems to harvest energy from the fluid flow through the instrumented coupling, such as a piezoelectric unit that harvests energy from vibrations caused by the flowing fluid, or a thermoelectric unit that harvests energies from temperature differentials in the flowing fluid, among other types of energy harvesting systems.

The data store 510 includes code modules that include instructions that, when executed by the processor 506, direct the processor 506 to perform the functions described herein. For example, the data store 510 includes a read sensor module 518 that directs the processor 506 to read measurements from the sensors 214, and store the measurements. A comparison module 520 directs the processor 506 to compare the measurements to a calibration curve, or to preset limits, and to generate a proportional output of tracer compounds that correspond to the measurement. A signaling module 522 directs the processor 506 to use the communications device 222 to communicate the measurements to a surface detector 524, for example, by releasing tracer compounds 310 that are proportional to, or indicative of, conditions in the instrumented coupling, as described herein.

FIG. 6 is a block diagram of another instrumentation package 600 that may be used in an instrumented coupling 108, in accordance with an example. Like numbered items are as described with respect to FIGS. 1, 2A, 2B, and 5. In this example, the instrumentation package 600 uses an ultrasonic transceiver 602 as the communications device 222. The controller 218 includes a communications system 604 to interface to the ultrasonic transceiver 602. The communications system 604 may be a driver for the ultrasonic transceiver 602, such as MOSFETs to energize the ultrasonic transceiver 602, translating digital communications from the bus 508 into ultrasonic sound waves using the ultrasonic transceiver 602.

Accordingly, the data store 510 may include code modules specific to the use of the ultrasonic communications. The code modules, when executed by the processor 506, direct the processor to perform the functions described herein. The code modules include a read sensor module 606, performing analogous functions to the read sensor module 518, described with respect to FIG. 5. Similarly, a comparison module 608 directs the processor 506 to compare the measurements to a calibration curve, or to preset limits, and to generate a digital signal representing the measurement values. A signaling module 610 directs the processor 506 to use the communications device 222 to communicate the measurements to a surface transceiver 612, for example, using ultrasonic waves 614 to communicate the measurements.

FIG. 7 is a block diagram of another instrumentation package 700 that may be used in an instrumented coupling 108, in accordance with an example. Like numbered items are as described with respect to FIGS. 1, 2A, 2B, and 5. In this example, the instrumentation package 700 uses a communications interface 702, such as a serial bus interface, to couple the bus 508 to a power line communications transceiver 704 as the communications device 222. The power line communications transceiver 704 uses filters to block low-frequency power signals from the power line 706, while allowing high-frequency communication signals to pass. Accordingly, the power line communications transceiver 704 superimposes high-frequency signals on the power line 706 to communicate between the instrumentation package 700 and a surface power and communications unit 708. The power line communications transceiver 704 may be a commercial device, such as a power line communications modem from Maxim Integrated, or from ON Semiconductor, among others.

Further, in this example, the power line 706 is coupled to a battery/power supply 710 to power the instrumentation package 700, charge a battery in the battery/power supply 710, or both. The battery may provide backup power for collecting measurements if power over the power line 706 is interrupted. In this example, the restoration of communications may trigger downloading of measurements taken to the surface.

Accordingly, the data store 510 may include code modules specific to the use of the power line communications. The code modules, when executed by the processor 506, direct the processor to perform the functions described herein. The code modules include a read sensor module 712, performing analogous functions to the read sensor module 518 described with respect to FIG. 5. Similarly, a comparison module 714 directs the processor 506 to compare the measurements to a calibration curve, or to preset limits, and to generate a digital signal representing the measurement values. A signaling module 716 directs the processor 506 to use the communications device 222 to communicate the measurements to the surface power and communications unit 708, for example, using a high-frequency communication signal superimposed on the power line 706 to communicate the measurements.

The configuration of the instrumentation packages is not limited to that shown in FIGS. 5, 6, and 7. Combinations of the features shown may be useful for implementations. For example, an instrumentation package may include both the tracer store 502 of the instrumentation package 500 described with respect to FIG. 5 and the ultrasonic transceiver 602 of the instrumentation package 600 described with respect to FIG. 6. In this example, traces may be released from the tracer store 502 until the tracer store 502 is empty; then ultrasonic communications may be used to communicate measurement values to the surface. This may enable a longer battery life than using ultrasonic communications by itself.

As another example, a power line communications interface 702, as described with respect to the instrumentation package 700 of FIG. 7, may be used in an instrumentation package in combination with a tracer store 502, as discussed with respect to FIG. 5. In this example, measurement values are communicated to the surface through the power line communications interface 702. At some point in time, for example, when a field is in production and less equipment is located at the surface, the power line 706 may be disconnected from the surface power and communications unit 708. At that point, measurements may be communicated from the instrumentation package 700 using tracers released from the tracer store 502 for as long as the tracers or the battery lasts.

Figure 8:
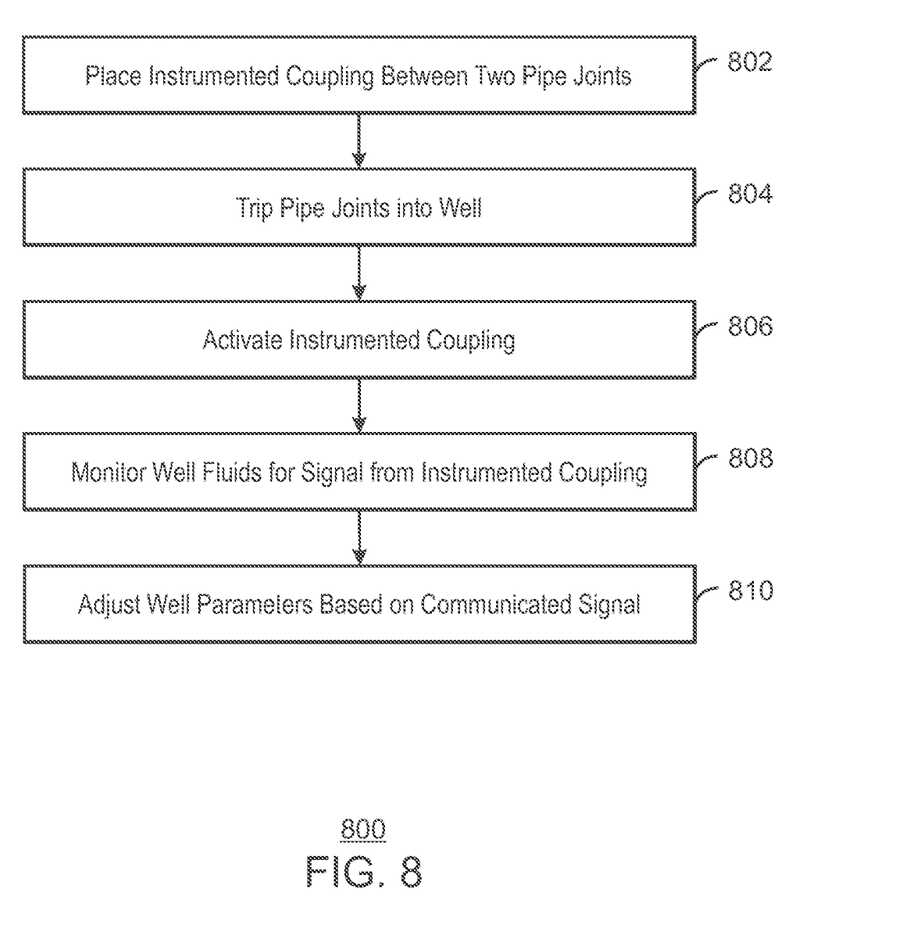
FIG. 8 is a process flow diagram of a method for using an instrumented coupling in a well, in accordance with an example.

FIG. 8 is a process flow diagram of a method 800 for using an instrumented coupling in a well, in accordance with an example. The method 800 begins at block 802, when an instrumented coupling is placed between two pipe joints. At block 804, the pipe joints including the instrumented coupling are tripped, or inserted, into a well.

At block 806, the instrumented coupling is activated. This may be performed using a timer in the controller to bring the instrumented coupling to full power at a particular point in time, and initiate the taking of measurements. In some examples, the instrumented coupling is active before and during insertion into the well. In other examples, such as when an ultrasonic transceiver is used for communications, a partial enablement may allow the controller to be listening for an activation signal. In other examples, such as when a power line communications device is used for communications, energizing the power line to the instrumented coupling may boot the controller and initiate the communications with the surface.

At block 808, fluids flowing from the well are monitored for a signal from the instrumented coupling. In some embodiments, this may be done by using an instrument to detect tracer compounds in the fluids, such as a fluorimeter or a radiation detector. In other embodiments, the fluids may be monitored for ultrasonic signals communicated by the instrumented coupling. It may be noted that multiple couplings may be used in a single well. In that case, different tracer compounds may be used to identify which instrumented coupling is the source of a particular measurement. Further, different ultrasonic frequencies may be used for different instrumented couplings to allow overlapping communications. In some embodiments, a controller may listen for ultrasonic frequencies from other instrumented couplings, and wait to communicate until the communications from the other instrumented couplings are completed. In ultrasonic communications, the digital signal associated with the measurement may also include an identification code associated with the instrumented coupling. In examples that use power line communications, the power lines may be directly monitored for communications from each of the instrumented couplings in a well.

At block 810, well parameters are adjusted based on the measurements that are collected. For example, if excess sand deposition is detected, flow may be increased to sweep the sand out of the well or flow may be decreased to lower the amount of sand being brought into the well from the wellbore. In some examples, the amount of material detected in the well may be used to make a determination that a well cleanout needs to occur.

Figure 9:
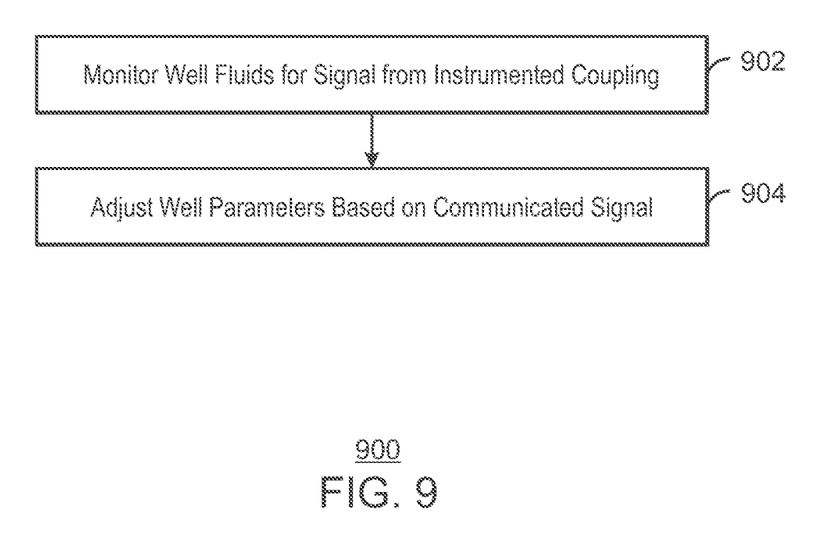
FIG. 9 is a process flow diagram of another method for using an instrumented coupling in a well, in accordance with an example.

FIG. 9 is a process flow diagram of another method 900 for using an instrumented coupling in a well, in accordance with an example. The method 900 includes blocks 902 and 904, which correspond to blocks 808 and 810 of the method 800 of FIG. 8. In various embodiments, blocks 902 and 904 provide the core functional operations of the use of the instrumented coupling.

The process flow diagrams of FIGS. 8 and 9 are not intended to indicate that the methods 800 and 900 are to include all of the blocks shown in FIGS. 8 and 9 in every case. Moreover, any number of additional blocks may be included within the methods 800 and 900, depending on the details of the specific implementation.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for using an instrumented coupling to monitor parameters in a well, comprising:
   providing an instrumented coupling within a well, wherein the instrumented coupling comprises a plurality of sensors disposed in an inset ring in an inner circumference of the instrumented coupling between a first threaded end of the instrumented coupling that is threaded to a first pipe joint within the well and a second threaded end of the instrumented coupling that is threaded to a second pipe joint within the well;
   monitoring the well for a signal from the instrumented coupling, wherein the signal indicates a measurement of a parameter in the well; and
   adjusting the parameter based on the signal.

2. The method of claim 1, comprising releasing compounds into a fluid flow from the well based, at least in part, on the parameter.

3. The method of claim 2, comprising detecting the compounds in the fluid flow by fluorescence.

4. The method of claim 2, comprising detecting the compounds in the fluid flow based, at least in part, on radioactivity of the compounds.

5. The method of claim 1, comprising communicating with the instrumented coupling through an ultrasonic transceiver.

6. The method of claim 1, wherein the signal indicates a level of sand in the well.

7. The method of claim 1, wherein the signal indicates an amount of entrained water in a fluid from the well.

8. The method of claim 1, wherein the signal indicates an amount of entrained gas in a fluid from the well.

9. The method of claim 1, wherein the signal indicates a pressure of a fluid within the well.

10. The method of claim 1, wherein the signal indicates a temperature of a fluid within the well.

11. The method of claim 1, wherein the signal indicates a flow rate of a fluid within the well.

12. The method of claim 1, wherein providing the instrumented coupling within the well comprises:
   placing the instrumented coupling between the first pipe joint and the second pipe joint;
   tripping the first pipe joint, the instrumented coupling, and the second pipe joint into the well; and
   activating the instrumented coupling.

13. An instrumented coupling for pipe joints, comprising:
   a first threaded end configured to thread to a first pipe joint;
   a second threaded end configured to thread to a second pipe joint;
   a plurality of sensors configured to obtain a measurement of a parameter of a well,
      wherein the plurality of sensors are disposed in an inset ring in an inner circumference of the instrumented coupling between the first threaded end and the second threaded end;
   a communications device configured to communicate to a receiving device outside of the well;
   a processor configured to execute instructions in a data store, wherein the instructions direct the processor to:
      read the measurement from the sensor;
      compare the measurement from the sensor to a preset limit; and
      generate a signal within the communications device based, at least in part, on the measurement.

14. The instrumented coupling of claim 13, wherein the sensor comprises a surface acoustic wave sensor.

15. The instrumented coupling of claim 13, wherein the sensor comprises a thin-film bulk acoustic resonator sensor.

16. The instrumented coupling of claim 13, wherein the communications device comprises:
   a reservoir comprising a store of a tracer compound; and
   a control valve configured to release a controlled amount of the tracer compound into a fluid flow in the pipe joints.

17. The instrumented coupling of claim 16, wherein the control valve comprises a microelectronic mechanical system (MEMS) valve.

18. The instrumented coupling of claim 16, wherein the tracer compound comprises a fluorescent dye.

19. The instrumented coupling of claim 16, wherein the tracer compound comprises a radioactive isotope.

20. The instrumented coupling of claim 16, wherein the tracer compound is detected by a receiving device at a surface.

21. The instrumented coupling of claim 16, wherein the control valve is configured to release the controlled amount of the tracer compound into the fluid flow in the pipe joints based, at least in part, on the parameter of the well.

22. The instrumented coupling of claim 16, wherein the control valve is configured to release controlled amounts of different tracer compounds into the fluid flow in the pipe joints based, at least in part, on the parameter of the well.

23. The instrumented coupling of claim 13, wherein the communications device comprises an ultrasonic transceiver.

24. The instrumented coupling of claim 13, comprising a battery.

25. The instrumented coupling of claim 13, comprising an energy harvesting system configured to obtain energy from a flow of fluid through the instrumented coupling.

26. The instrumented coupling of claim 13, wherein the communications device comprises a power line communications transceiver.

27. A lateral wellbore, comprising a pipe string comprising an instrumented coupling disposed between a first pipe joint and a second pipe joint in the pipe string, wherein the instrumented coupling comprises a plurality of sensors disposed in an inset ring in an inner circumference of the instrumented coupling between a first threaded end of the instrumented coupling that is threaded to the first pipe joint and a second threaded end of the instrumented coupling that is threaded to the second pipe joint, and wherein the instrumented coupling is configured to detect a parameter of the lateral wellbore and send a signal to a surface device.

28. The lateral wellbore of claim 27, wherein the instrumented coupling is configured to release a compound in a fluid flow in the pipe string based, at least in part, on detecting the parameter of the lateral wellbore.

29. The lateral wellbore of claim 28, wherein the instrumented coupling is configured to release an amount of the compound based, at least in part, on the parameter of the lateral wellbore.

30. The lateral wellbore of claim 28, wherein the instrumented coupling is configured to release different compounds based, at least in part, on the parameter of the lateral wellbore.

31. The lateral wellbore of claim 27, wherein the parameter comprises a level of sand within the lateral wellbore.

32. The lateral wellbore of claim 27, wherein the parameter comprises a temperature of a fluid within the lateral wellbore.

33. The lateral wellbore of claim 27, wherein the parameter comprises a pressure of a fluid within the lateral wellbore.

34. The lateral wellbore of claim 27, wherein the parameter comprises a flow rate of a fluid within the lateral wellbore.

35. The lateral wellbore of claim 27, wherein the instrumented coupling is configured to communicate with the surface device through an ultrasonic transceiver.

\* \* \* \* \*

UNITED STATES PATENT AND TRADEMARK OFFICE
CERTIFICATE OF CORRECTION

PATENT NO. : 11,326,440 B2
APPLICATION NO. : 16/939142
DATED : May 10, 2022
INVENTOR(S) : Benjamin J. Spivey et al.

It is certified that error appears in the above-identified patent and that said Letters Patent is hereby corrected as shown below:

On the Title Page

Item [72], insert fourth inventor: --P. Matthew Spiecker, Manvel, TX (US)--

Signed and Sealed this
Twenty-third Day of August, 2022

Katherine Kelly Vidal
*Director of the United States Patent and Trademark Office*